UNITED STATES PATENT OFFICE.

EDWARD B. BROGLEY, OF MOBILE, ALABAMA.

PROCESS OF PACKING GLASS AND PRESERVATIVE COMPOSITION THEREFOR.

1,293,684.   Specification of Letters Patent.   Patented Feb. 11, 1919.

No Drawing.   Application filed June 29, 1918.   Serial No. 242,680.

*To all whom it may concern:*

Be it known that I, EDWARD B. BROGLEY, a citizen of the United States, residing at Mobile, in the county of Mobile and State of Alabama, have invented certain new and useful Improvements in Processes of Packing Glass and Preservative Compositions Therefor, of which the following is a specification.

This invention relates to an improved process of packing glass and a preservative composition therefor, and has for its primary object to provide means for preventing the discoloration of a glass surface caused by the rotting of the straw in which it is packed for shipment.

It is a more particular object of the invention to provide an improved process for the above purpose involving the application to the surfaces of the glass of a preservative composition consisting of sulfuric acid, oil and water.

And it is another object of the invention to provide a further step in the process which consists in the application of a preservative agent to the straw in which the glass is packed, whereby rotting of the straw is prevented.

With the above and other objects in view, the present invention consists in the improved process which I have hereinafter set forth and the preservative composition involved therein whereby the desired end may be attained.

As is well known to manufacturers of window-pane glass, the surfaces of the glass frequently become discolored by the rotting of the straw in which the glass is packed for shipment. This discoloration is ineradicable so that the glass is worthless for any useful purpose.

The staining or discoloration of the glass surface is caused by the sweating of the glass, due to atmospheric changes, which in turn rots the straw in which the glass is tightly packed. Fumes are generated by the rotting straw which burn the glass and cause the surfaces thereof to become greatly discolored or stained. This discoloration in many cases is such as to render the glass opaque. It is, therefore, the primary purpose of the present invention to provide a simple and effective remedy for this difficulty and thereby obviate considerable monetary loss.

To the above end, I first prepare a composition by thoroughly mixing together one teaspoonful of sulfuric acid, one teaspoonful of crude lubricating oil, and one pint of water. This composition is strained through cheese-cloth or other suitable material, and is then sprayed upon the surfaces of the glass. It will, of course, be apparent that the composition may be prepared in a larger quantity, adhering substantially to the proportions of the ingredients as above given, so that the glass can be dipped in the solution. It has been demonstrated that such a preservative composition applied to the glass effectually prevents the staining or discoloration of the surfaces by the rotting of the packing straw. The sweating of the glass improves or enhances this attribute of the coating preparation. Preferably, however, after the glass has been packed in the straw, the straw is sprayed with creosote, which has a tendency to prevent the rotting of the straw. The glass thus packed for shipment will not be injuriously affected in any climate to which it may be transported. The invention has been severely tested by subjecting the glass after packing to high temperatures, and has emerged from such tests without the slightest discoloration.

From the foregoing description, it is believed that the several features of my process and preservative composition and the manner in which the invention is to be carried out in practice will be clearly and fully understood. The composition is simple and the several ingredients thereof may be obtained at nominal cost. This composition is easily applied to glass surfaces and the treatment of the glass and straw in the manner hereinbefore explained will consume but little extra time in the packing of the glass for shipment.

I claim:—

1. The herein described process of packing glass for shipment which consists in first coating the surfaces of the glass with a composition containing sulfuric acid, lubricating oil and water, and then packing the glass in straw.

2. The herein described method of packing glass for shipment which consists in first coating the surfaces of the glass with a composition containing equal parts of sulfuric acid and lubricating oil, and then packing the glass in a vegetable cushioning material.

3. The herein described preservative composition for glass consisting of sulfuric acid, crude lubricating oil, and water.

4. The herein described preservative composition for glass consisting of sulfuric acid and lubricating oil in equal quantities, and water.

In testimony whereof I hereunto affix my signature in the presence of two witnesses.

EDW. B. BROGLEY.

Witnesses:
GEO. E. STONE,
GEO. A. DORLON.